(12) United States Patent
Huh et al.

(10) Patent No.: US 9,315,186 B1
(45) Date of Patent: Apr. 19, 2016

(54) APPARATUS AND METHOD FOR CONTROLLING CREEP TORQUE OF HYBRID ELECTRIC VEHICLE

(71) Applicants: Hyundai Motor Company, Seoul (KR); Kia Motors Corporation, Seoul (KR)

(72) Inventors: Jee Wook Huh, Bucheon-si (KR); Gwang Il Du, Incheon (KR); Sung Deok Kim, Seongnam-si (KR); Teh Hwan Cho, Anseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/755,139

(22) Filed: Jun. 30, 2015

(30) Foreign Application Priority Data

Sep. 30, 2014 (KR) .................. 10-2014-0131638

(51) Int. Cl.
*B60L 9/00* (2006.01)
*B60W 20/00* (2006.01)
*B60L 15/20* (2006.01)
*B60K 6/48* (2007.10)

(52) U.S. Cl.
CPC .................. *B60W 20/00* (2013.01); *B60K 6/48* (2013.01); *B60L 15/2063* (2013.01); *B60W 2510/1005* (2013.01); *B60W 2520/10* (2013.01); *B60W 2540/10* (2013.01); *B60W 2540/12* (2013.01); *B60W 2710/083* (2013.01); *Y10S 903/902* (2013.01)

(58) Field of Classification Search
None
See application file for complete search history.

(56) References Cited

U.S. PATENT DOCUMENTS

| | | | | |
|---|---|---|---|---|
| 4,412,290 | A | * 10/1983 | Pannier | F02P 7/067 477/115 |
| 2009/0112425 | A1 | * 4/2009 | Popp | F16H 61/0437 701/62 |
| 2009/0240411 | A1 | 9/2009 | Amamiyama et al. | |
| 2012/0150384 | A1 | 6/2012 | Jung et al. | |

FOREIGN PATENT DOCUMENTS

| | | | |
|---|---|---|---|
| JP | 2000-102114 | A | 4/2000 |
| JP | 3675080 | B2 | 7/2005 |
| JP | 2006-298064 | A | 11/2006 |
| JP | 2009-273325 | A | 11/2009 |
| JP | 2012-90442 | A | 5/2012 |
| KR | 10-2005-0064975 | A | 6/2005 |
| KR | 10-2006-0045762 | A | 5/2006 |
| KR | 10-2007-0091811 | A | 9/2007 |
| KR | 10-2012-0058147 | A | 6/2012 |

* cited by examiner

*Primary Examiner* — Adam Alharbi
(74) *Attorney, Agent, or Firm* — Morgan, Lewis & Bockius LLP (57) ABSTRACT

An apparatus and a method for controlling a creep torque of a hybrid electric vehicle that outputs the creep torque to improve shift feel and fuel consumption of the hybrid electric vehicle, may include the method for controlling a creep torque of a hybrid electric vehicle that may include detecting data of the hybrid electric vehicle for controlling the creep torque, determining whether a vehicle speed is greater than or equal to a predetermined speed and the hybrid electric vehicle is shifting from a current shift stage to 1 stage when the current shift stage is 3 stage or 2 stage, applying a creep torque factor depending on a shift stage and a brake amount when the hybrid electric vehicle is shifting from 3 stage or 2 stage to 1 stage, and controlling a motor to output the creep torque to which the creep torque factor is applied.

14 Claims, 7 Drawing Sheets

APPARATUS AND METHOD FOR CONTROLLING CREEP TORQUE OF HYBRID ELECTRIC VEHICLE

CROSS-REFERENCE TO RELATED APPLICATION

The present application claims priority to and the benefit of Korean Patent Application No. 10-2014-0131638 filed on Sep. 30, 2014, the entire contents of which is incorporated herein for all purposes by this reference.

BACKGROUND OF THE INVENTION

1. Field of the Invention

The present invention relates to an apparatus and a method for controlling a creep torque of a hybrid electric vehicle. More particularly, the present invention relates to an apparatus and a method for controlling a creep torque of a hybrid electric vehicle that outputs the creep torque to improve shift feel and fuel consumption of the hybrid electric vehicle.

2. Description of Related Art

A hybrid vehicle is a vehicle using two or more different kinds of power sources and is generally a vehicle that is driven by an engine that obtains a driving torque by burning fuel and a motor that obtains a driving torque with battery power.

Hybrid electric vehicles can be provided with optimum output torque, depending on how the engine and the motor are operated while the vehicles are driven by the two power sources, that is, the engine and the motor.

The hybrid vehicle may be formed in various structures using an engine and an electric motor as a power source, and a Transmission Mounted Electric Device (TMED) type hybrid vehicle in which a motor is attached to a transmission and in which an engine clutch is inserted between the transmission and the engine may implement an EV mode and an HEV mode using disconnection and connection of the engine clutch.

The hybrid electric vehicle generally uses a continuously variable transmission (CVT) or a stepped automatic transmission. Of these, the hybrid electric vehicle on which the stepped automatic transmission is mounted performs 3-1 shift or 2-1 shift before stopping for power performance and fuel consumption efficiency. In this shift process, a shift feel may be deteriorated when a torque variation is generated, a torque is less than 0, or a torque is too high.

Therefore, the hybrid electric vehicle controls a creep torque according to a predetermined creep torque map by using a motor control.

Figure 4:
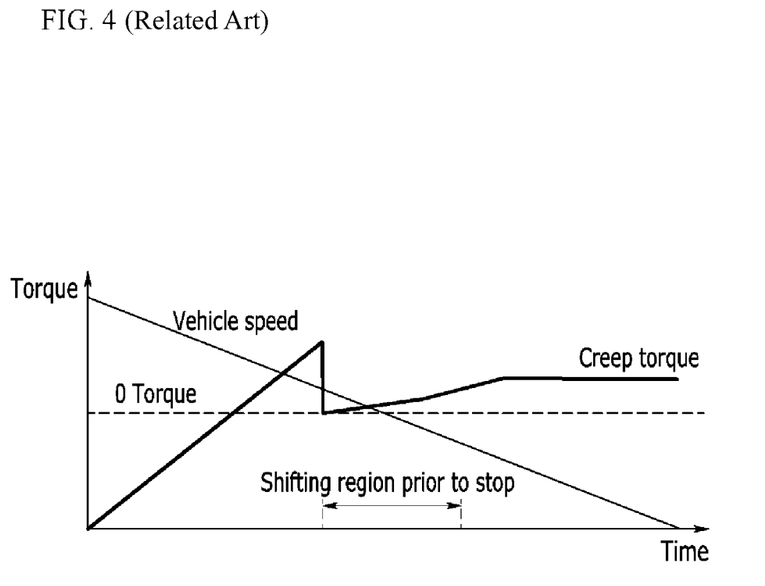
FIG. 4 and FIG. 5 are graphs illustrating a relation between a vehicle speed and a creep torque according to a conventional art.
Figure 5:
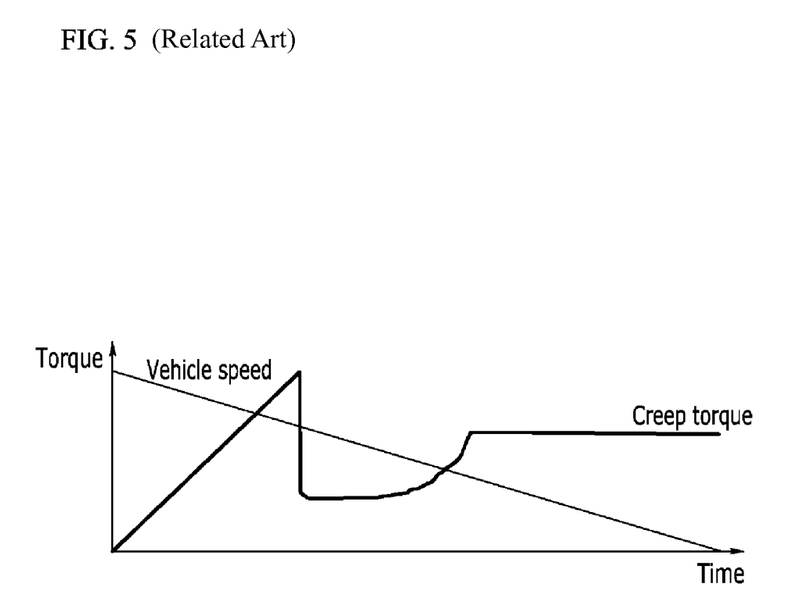

FIG. 4 and FIG. 5 are graphs illustrating a relation between a vehicle speed and a creep torque according to a conventional art.

As shown in FIG. 4, if the creep torque of the hybrid electric vehicle is increased and exceeds 0 torque before stopping and shifting, which results in deterioration of fuel consumption. Moreover, a shift feel may be deteriorated during shifting before stopping because a torque variation is generated.

Meanwhile, as shown in FIG. 5, the creep torque of the hybrid electric vehicle is sharply decreased by applying creep torque logic according to a predetermined creep torque map when the hybrid electric vehicle is running at a low speed with 1 shift stage. After that, the creep torque is increased again when the vehicle speed is decreased sufficiently, a driver may feel a sense of difference at this moment.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and a method for controlling a creep torque of a hybrid electric vehicle having advantages of outputting the creep torque to improve shift feel and fuel consumption of the hybrid electric vehicle.

An aspect of the present invention provides a method for controlling a creep torque of a hybrid electric vehicle that may include detecting data of the hybrid electric vehicle for controlling the creep torque, determining whether a vehicle speed is greater than or equal to a predetermined speed and the hybrid electric vehicle is shifting from a current shift stage to 1 stage when the current shift stage is 3 stage or 2 stage, applying a creep torque factor depending on a shift stage and a brake amount when the hybrid electric vehicle is shifting from 3 stage or 2 stage to 1 stage, and controlling a motor to output the creep torque to which the creep torque factor is applied.

The method may further include determining whether the brake amount is greater than or equal to a predetermined value when the current shift stage of the hybrid electric vehicle is 1 stage or R stage, and applying a predetermined creep torque factor when the brake amount is greater than or equal to the predetermined value.

The predetermined creep torque factor may be set as a creep torque factor in case the vehicle speed is 0.

The method may further include controlling the motor to output the creep torque less than or equal to 0 when the hybrid electric vehicle is not shifting and the current shift stage of the hybrid electric vehicle is 3 stage or 2 stage.

The creep torque factor depending on the shift stage and the brake amount may be set to output the creep torque less than or equal to 0 in a real shifting region.

The creep torque factor depending on the shift stage and the brake amount may be set to gradually increase the creep torque by a 1 stage maximum creep torque after the real shifting region.

The data may include information on at least one of a position of an accelerator pedal, a position of a brake pedal, a vehicle speed and a shift stage of the vehicle.

Another embodiment of the present invention provides an apparatus for controlling a creep torque of a hybrid electric vehicle that may include a data detector configured to detect data for controlling the creep torque of the hybrid electric vehicle, a motor configured to output the creep torque, a transmission configured to adjust a shift stage by being connected to the motor, and a controller configured to control the motor to output the creep torque by applying a creep torque factor depending on a shift stage and a brake amount when a vehicle speed is greater than or equal to a predetermined speed, a current shift stage of the hybrid electric vehicle is 3 stage or 2 stage, and the hybrid electric vehicle is shifting from 3 stage or 2 stage to 1 stage based on data detected by the data detector.

The controller may control the motor to output the creep torque less than or equal to 0 when the current shift stage of the hybrid electric vehicle is 3 stage or 2 stage and the hybrid electric vehicle is not shifting.

The controller may set the creep torque factor to output the creep torque less than or equal to 0 in a real shifting region when the hybrid electric vehicle is shifting from 3 stage or 2 stage to 1 stage.

The controller may set the creep torque factor to gradually increase the creep torque by a 1 stage maximum creep torque after the real shifting region when the hybrid electric vehicle is shifting from 3 stage or 2 stage to 1 stage.

The controller may control the motor to output the creep torque by applying a predetermined creep torque factor when the current shift stage of the hybrid electric vehicle is 1 stage or R stage and the brake amount is greater than or equal to a predetermined value.

The predetermined creep torque factor may be set as a creep torque factor in case the vehicle speed is 0.

The data detector may include an accelerator pedal position sensor, a brake pedal position sensor, a vehicle speed sensor and a shift stage sensor.

According to an aspect of the present invention as described above, fuel consumption and shift feel of the hybrid electric vehicle can be improved by controlling the creep torque during shifting prior to stop.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Throughout this specification and the claims which follow, unless explicitly described to the contrary, the word "comprise" and variations such as "comprises" or "comprising" will be understood to imply the inclusion of stated elements but not the exclusion of any other elements.

Like reference numerals designate like elements throughout the specification.

It is understood that the term "vehicle, "vehicular" or other similar terms as used herein is inclusive of motor vehicles in general, including hybrid vehicles, plug-in hybrid electric vehicles and other alternative fuel vehicles (e.g., fuels derived from resources other than petroleum). As referred to herein, a hybrid electric vehicle is a vehicle that has two or more sources of power, for example a vehicle that is both gasoline powered and electricity powered.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, a controller, or the like. Examples of computer readable media include, but are not limited to, ROM, RAM, compact disc (CD)-ROM, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

An exemplary embodiment of the present invention will hereinafter be described in detail with reference to the accompanying drawings.

Figure 1:
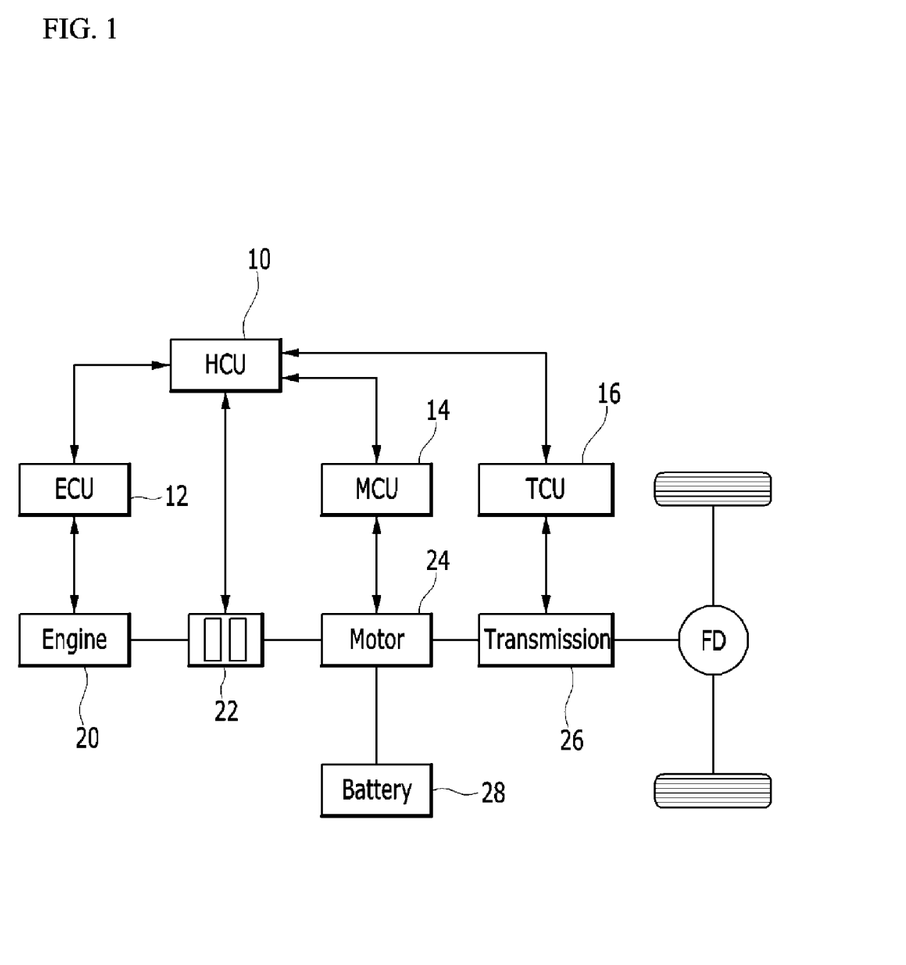
FIG. 1 is a schematic diagram of a hybrid system to which a method for controlling a creep torque of a hybrid electric vehicle is applied according to an exemplary embodiment of the present invention.

FIG. 1 is a schematic diagram of a hybrid system to which a method for controlling a creep torque of a hybrid electric vehicle is applied according to an exemplary embodiment of the present invention.

The hybrid system as shown in FIG. 1 is an exemplary embodiment of the present invention for better comprehension and ease of description. Therefore, a method for controlling engine starting while shifting of a hybrid electric vehicle according to an exemplary embodiment of the present invention may not only be applied to the hybrid system as shown in FIG. 1, but may also be applied to all other hybrid systems.

As shown in FIG. 1, the hybrid system to which a method for controlling torque reduction of a hybrid electric vehicle is applied according to an exemplary embodiment of the present invention includes a hybrid control unit (HCU) 10, an electronic control unit (ECU) 12, a motor control unit (MCU) 14, a transmission control unit (TCU) 16, an engine 20, an engine clutch 22, a motor 24, a transmission 26, and a battery 28.

The HCU 10 controls operation of other controllers which mutually exchange information in an entire operation of a hybrid electric vehicle, so the HCU 10 controls output torque of the engine 20 and the motor 24 by cooperating with the other controllers.

The ECU 12 controls an entire operation of the engine 20 according to conditions of the engine 20, such as a demand torque of a driver, a coolant temperature, and an engine torque.

The MCU 14 controls an entire operation of the motor 24 according to a demand torque of a driver, a driving mode of the hybrid electric vehicle, and an SOC condition of the battery 28.

The TCU 16 controls an entire operation of the transmission 26 such as speed ratios of the transmission 26 depending on output torque of the engine 20 and the motor 24, and an amount of regenerative braking.

The engine 20 outputs power as a power source while turned on.

The engine clutch 22 is disposed between the engine 20 and the motor 24 to receive a control signal of the HCU 10, and selectively connects the engine 20 and the motor 24 according to a driving mode of the hybrid electric vehicle.

The motor 24 is operated by a 3-phase AC voltage applied from the battery 28 through an inverter to generate torque, and operates as a power generator and supplies regenerative energy to the battery 28 in a coast-down mode.

The transmission 26 supplies a sum of an output torque of the engine 20 and an output torque of the motor 24 determined by coupling and releasing of the engine clutch 22 as an input torque, and selects a shift gear according to a vehicle speed and a driving condition to output driving force to a driving wheel and maintain driving.

The battery 28 includes a plurality of unit cells, and stores a high voltage for supplying a voltage to the motor 24, for example, 400 V to 450 V DC.

The battery 28 supplies a voltage to the motor 24 for supporting power output from the engine 20 in an HEV mode or provides driving force in an EV mode, and is charged by regenerative braking energy.

The hybrid system as described above is obvious to a person of ordinary skill in the art, so a detailed explanation thereof will be omitted.

Figure 2:
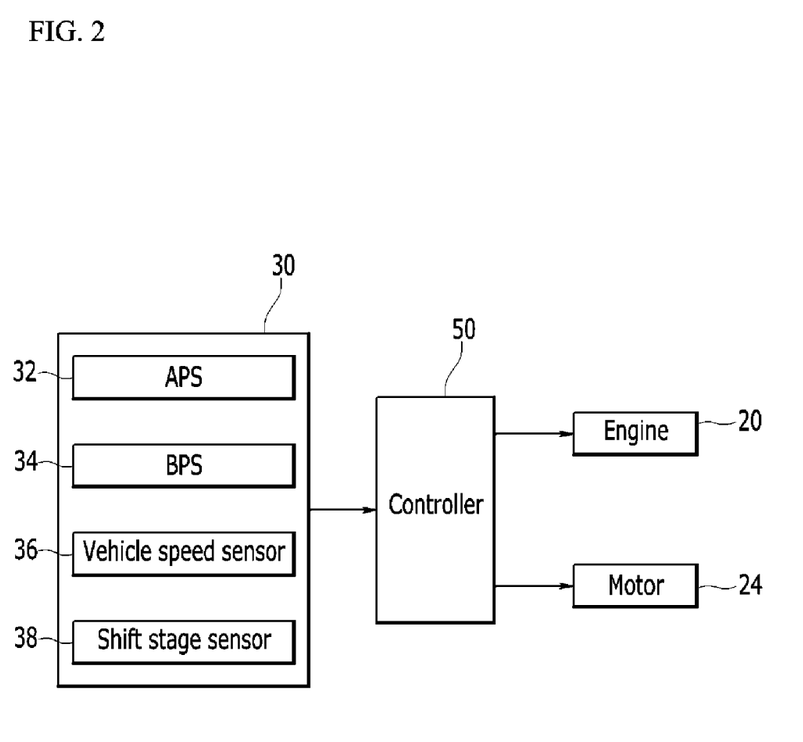
FIG. 2 is a schematic block diagram of an apparatus for controlling a creep torque of a hybrid electric vehicle according to an exemplary embodiment of the present invention.

FIG. 2 is a schematic block diagram of an apparatus for controlling a creep torque of a hybrid electric vehicle according to an exemplary embodiment of the present invention.

As shown in FIG. 2, an apparatus for controlling a creep torque of a hybrid electric vehicle according to an exemplary embodiment of the present invention includes a data detector 30, an engine 20, a motor 24, and a controller 50.

Some processes in the method for controlling mode change of the hybrid electric vehicle according to an exemplary embodiment of the present invention to be described below may be performed by the ECU 12 and the MCU 14, and some other processes may be performed by the HCU 10. Accordingly, for convenience of description, in this specification and claims, many controllers provided in the hybrid electric vehicle such as the ECU 12, the MCU 14 and the HCU 10 are called the controller 50.

The hybrid electric vehicle to which an exemplary embodiment of the present invention is applied includes at least one engine 20 and at least one motor 24. In addition, the hybrid electric vehicle provides a driving mode in which the engine 20 and the motor 24 separately or simultaneously operate as a power source. For this purpose, the engine clutch is disposed between the engine 20 and the motor 24 to selectively connect the engine 20 and the motor 24.

The data detector 30 of the hybrid electric vehicle detects a demand of the driver and the running state of the hybrid electric vehicle, and includes an accelerator pedal position sensor (APS) 32, a brake pedal position sensor (BPS) 34, a vehicle speed sensor 36 and a shift stage sensor 38.

The accelerator pedal position sensor 32 continuously detects a position value of an accelerator pedal and transmits a monitoring signal to the controller 50. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake pipe may be used instead of the accelerator pedal position sensor 32. Therefore, in this specification and the scope of the appended claims, the accelerator pedal position sensor 54 should include the throttle valve position sensor, and the position value of the accelerator pedal should be understood to be an opening value of the throttle valve.

The brake pedal position sensor 34 continuously detects a position value of a brake pedal and transmits a monitoring signal to the controller 50. The position value of the brake pedal may be 100% when the brake pedal is pressed fully, and the position value of the brake pedal may be 0% when the brake pedal is not pressed at all.

The vehicle speed sensor 36 detects a speed of the vehicle, and transmits a corresponding signal to the controller 50. The vehicle speed sensor 36 may be mounted to a wheel of the hybrid electric vehicle.

The shift stage sensor 38 detects a current shift stage of the hybrid electric vehicle, and transmits a corresponding signal to the controller 50.

The controller 50 controls the motor 24 to output the creep torque based on the signal detected by the data detector 30. The controller 50 may control the motor to output the creep torque by applying a creep torque factor depending on a shift stage and a brake amount when a vehicle speed is greater than or equal to a predetermined speed, a current shift stage of the hybrid electric vehicle is 3 stage or 2 stage, and the hybrid electric vehicle is shifting from 3 stage or 2 stage to 1 stage based on data detected by the data detector.

In addition, the controller 50 may control the motor to output the creep torque less than or equal to 0 when the current shift stage of the hybrid electric vehicle is 3 stage or 2 stage and the hybrid electric vehicle is not shifting.

On the other hand, the controller 50 may control the motor to output the creep torque by applying a predetermined creep torque factor in case the vehicle speed is 0 when the current shift stage of the hybrid electric vehicle is 1 stage or R stage and the brake amount is greater than or equal to a predetermined value.

To this end, the controller 50 may be implemented as at least one processor that is operated by a predetermined program, and the predetermined program may be programmed in order to perform each step of a method for controlling a creep torque of the hybrid electric vehicle according to an exemplary embodiment of the present invention.

Hereinafter, a method for controlling a creep torque of the hybrid electric vehicle according to an exemplary embodiment of the present invention will be described in detail with reference to FIG. 3 to FIG. 7.

Figure 3:
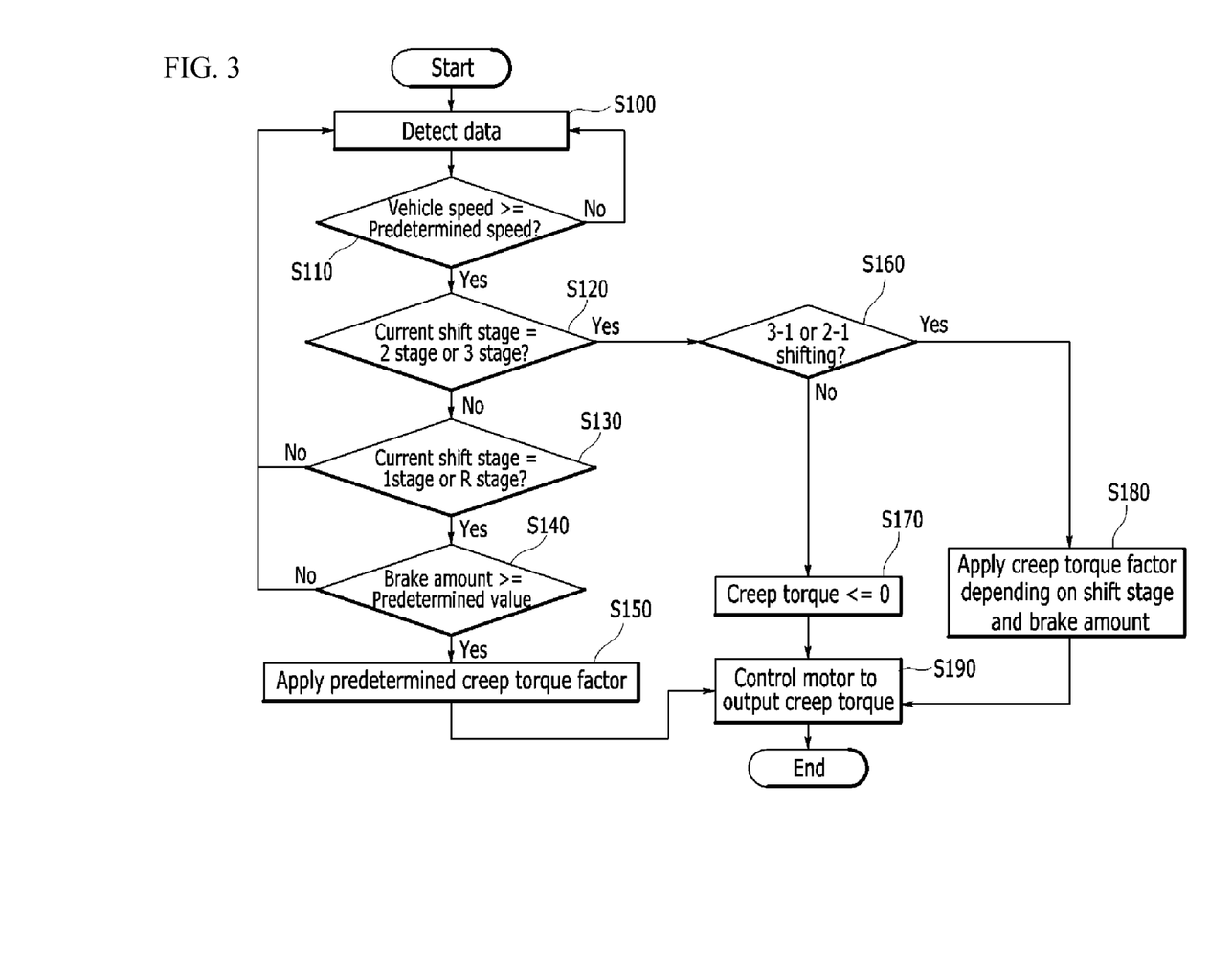
FIG. 3 is a flowchart showing a method for controlling a creep torque of a hybrid electric vehicle according to an exemplary embodiment of the present invention.

FIG. 3 is a flowchart showing a method for controlling a creep torque of a hybrid electric vehicle according to an exemplary embodiment of the present invention.

As shown in FIG. 3, a method for controlling a creep torque of a hybrid electric vehicle according to an exemplary embodiment of the present invention starts with detecting data of the hybrid electric vehicle for controlling the creep torque at step S100.

That is, an accelerator pedal position sensor 32 detects a position value of the accelerator pedal, a brake pedal position sensor 34 detects a position value of the brake pedal, a vehicle speed sensor 36 detects a vehicle speed of the hybrid electric vehicle, and a shift stage sensor 38 detects a current shift stage of the hybrid electric vehicle.

The controller 50 determines whether a vehicle speed is greater than or equal to a predetermined speed based on a detected signal at step S110.

When the vehicle speed is greater than or equal to the predetermined speed at the step S110, the controller 50 determines whether a current shift stage of the hybrid electric vehicle is 3 stage or 2 stage based on a signal detected by the shift stage sensor 38 at step S120.

When the current shift stage of the hybrid electric vehicle is 3 stage or 2 stage at the step S120, the controller 50 determines whether the hybrid electric vehicle is shifting from the current shift stage to 1 stage at step S160.

On the contrary, the current shift stage of the hybrid electric vehicle is not 3 stage or 2 stage at the step S120, the controller 50 determines whether the current shift stage of the hybrid electric vehicle is 1 stage or R stage at step S130.

If the current shift stage of the hybrid electric vehicle is 1 stage or R stage at the step S130, it may mean that the hybrid electric vehicle is running at a low speed because it is determined that the vehicle speed is greater than or equal to the predetermined speed at the step S110.

Therefore, the controller 50 determines whether a brake amount is greater than or equal to a predetermined value at step S140 to detect a braking demand of the driver while the hybrid electric vehicle is running at the low speed.

FIG. 5 is a graph illustrating a relation between a vehicle speed and a creep torque according to a conventional art.

As shown in FIG. 5, the creep torque is decreased rapidly, and then the creep torque is increased again by applying the creep torque logic if the hybrid electric vehicle stops during running at a low speed. At this time, the driver may experience displeasure due to a variation of the creep torque.

Therefore, the controller 50 applies a predetermined creep torque factor at step S150 when the brake amount is greater than or equal to the predetermined value and the braking demand of the driver is demanded at the step S140, and controls the motor 24 to output creep torque at step S190.

The predetermined creep torque factor may be set as a creep torque factor in case the vehicle speed is 0.

Figure 7:
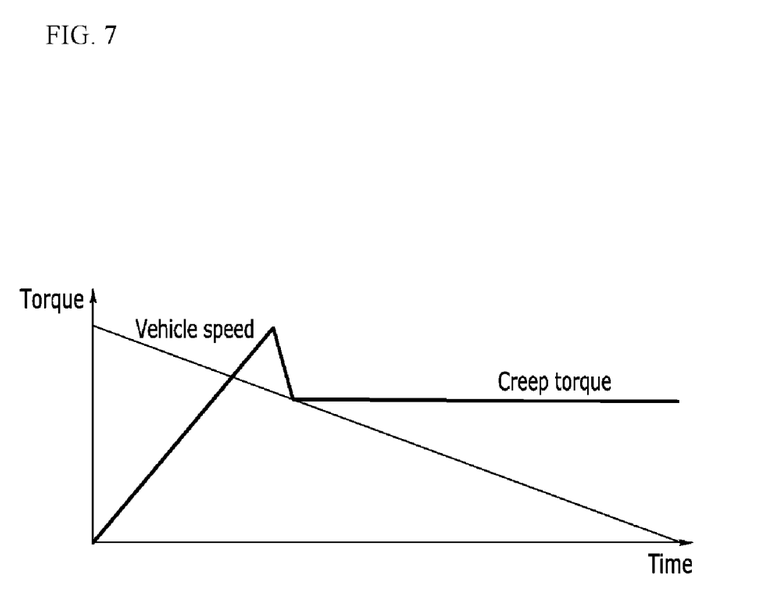

FIG. 7 is a graph illustrating a relation between a vehicle speed and a creep torque according to an exemplary embodiment of the present invention.

As shown in FIG. 7, when the creep torque factor in case the vehicle speed is 0 is applied, the creep torque is not rapidly decreased, so the variation of the creep torque may not be generated due to decrease of the vehicle speed. Therefore, the driver may stop the hybrid electric vehicle without displeasure due to the variation of the creep torque.

Meanwhile, when the current shift stage of the hybrid electric vehicle is 3 stage or 2 stage at the step S120, but the hybrid electric vehicle is not shifting at the step S160, the controller 50 controls the creep torque less than or equal to 0 at step S170, and controls the motor 24 to output the creep torque at step S190.

When the creep torque of the hybrid electric vehicle is output before the hybrid electric vehicle shifts, fuel consumption of the hybrid electric vehicle may be deteriorated due to battery discharge. Thus, the controller 50 controls the motor 24 to output the creep torque less than or equal to 0 before the hybrid electric vehicle shifts.

On the other hand, when the hybrid electric vehicle is shifting from 3 stage or 2 stage to 1 stage at the step S160, the controller 50 applies a creep torque factor depending on a shift stage and a brake amount at step S180, controls the motor 24 to output the creep torque to which the creep torque factor is applied at step S190.

The creep torque factor depending on the shift stage and the brake amount may be set to output the creep torque less than or equal to 0 in a real shifting region, and may be set to gradually increase the creep torque by a 1 stage maximum creep torque after the real shifting region.

Figure 6:
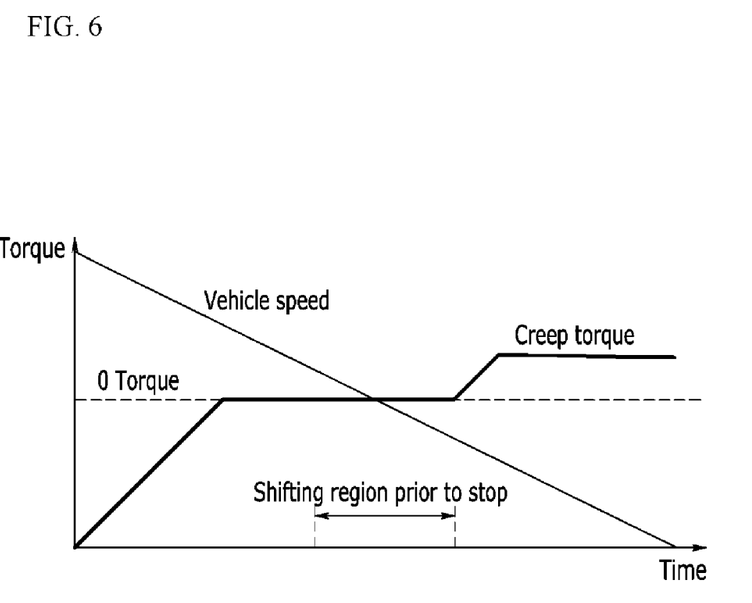
FIG. 6 and FIG. 7 are graphs illustrating a relation between a vehicle speed and a creep torque according to an exemplary embodiment of the present invention.

FIG. 4 is a graph illustrating a relation between a vehicle speed and a creep torque according to a conventional art, and FIG. 6 is a graph illustrating a relation between a vehicle speed and a creep torque according to an exemplary embodiment of the present invention.

As shown in FIG. 4, the creep torque is increased and exceeds 0 torque before the hybrid electric vehicle shifts prior to stop, fuel consumption may be deteriorated. Moreover, shift feel may be deteriorated because a torque variation is generated in the real shifting region.

However, according to an exemplary embodiment of the present invention as shown in FIG. 6, the torque variation may not be generated because the creep torque is controlled as 0 torque in real shifting region prior to stop. Also, the creep torque may be gradually increased after the real shifting region prior to stop. Thus, the creep torque output may be controlled as same as a 1 stage maximum creep torque.

According to an exemplary embodiment of the present invention, fuel consumption and shift feel of the hybrid electric vehicle can be improved by controlling the creep torque during shifting prior to stop.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a creep torque of a hybrid electric vehicle, comprising:
    detecting data of the hybrid electric vehicle for controlling the creep torque;
    determining whether a vehicle speed is greater than or equal to a predetermined speed and the hybrid electric vehicle is shifting from a current shift stage to 1 stage when the current shift stage is 3 stage or 2 stage;
    applying a creep torque factor depending on a shift stage and a brake amount when the hybrid electric vehicle is shifting from the 3 stage or the 2 stage to the 1 stage; and
    controlling a motor to output the creep torque to which the creep torque factor is applied.

2. The method of claim 1, further comprising
determining whether the brake amount is greater than or equal to a predetermined value when the current shift stage of the hybrid electric vehicle is the 1 stage or R stage; and
applying a predetermined creep torque factor when the brake amount is greater than or equal to the predetermined value.

3. The method of claim 2, wherein the predetermined creep torque factor is set as a creep torque factor when the vehicle speed is 0.

4. The method of claim 1, further comprising
controlling the motor to output the creep torque less than or equal to 0 when the hybrid electric vehicle is not shifting and the current shift stage of the hybrid electric vehicle is 3 stage or 2 stage.

5. The method of claim 1, wherein the creep torque factor depending on the shift stage and the brake amount is set to output the creep torque less than or equal to 0 in a real shifting region.

6. The method of claim 5, wherein the creep torque factor depending on the shift stage and the brake amount is set to increase the creep torque by a 1 stage maximum creep torque after the real shifting region.

7. The method of claim 1, wherein the data includes information on at least one of a position of an accelerator pedal, a position of a brake pedal, a vehicle speed and the shift stage of the vehicle.

8. An apparatus for controlling a creep torque of a hybrid electric vehicle, comprising:
a data detector configured to detect data for controlling the creep torque of the hybrid electric vehicle;
a motor configured to output the creep torque;
a transmission configured to adjust a shift stage by being connected to the motor; and
a controller configured to control the motor to output the creep torque by applying a creep torque factor depending on the shift stage and a brake amount when a vehicle speed is greater than or equal to a predetermined speed, a current shift stage of the hybrid electric vehicle is 3 stage or 2 stage, and the hybrid electric vehicle is shifting from the 3 stage or the 2 stage to 1 stage based on the data detected by the data detector.

9. The apparatus of claim 8, wherein the controller controls the motor to output the creep torque less than or equal to 0 when the current shift stage of the hybrid electric vehicle is the 3 stage or the 2 stage and the hybrid electric vehicle is not shifting.

10. The apparatus of claim 8, wherein the controller sets the creep torque factor to output the creep torque less than or equal to 0 in a real shifting region when the hybrid electric vehicle is shifting from the 3 stage or the 2 stage to the 1 stage.

11. The apparatus of claim 10, wherein the controller sets the creep torque factor to increase the creep torque by a 1 stage maximum creep torque after the real shifting region when the hybrid electric vehicle is shifting from the 3 stage or the 2 stage to the 1 stage.

12. The apparatus of claim 8, wherein the controller controls the motor to output the creep torque by applying a predetermined creep torque factor when the current shift stage of the hybrid electric vehicle is the 1 stage or R stage and the brake amount is greater than or equal to a predetermined value.

13. The apparatus of claim 12, wherein the predetermined creep torque factor is set as a creep torque factor when the vehicle speed is 0.

14. The apparatus of claim 8, wherein the data detector includes an accelerator pedal position sensor, a brake pedal position sensor, a vehicle speed sensor and a shift stage sensor.

* * * * *